United States Patent Office 3,586,737
Patented June 22, 1971

1

3,586,737
IMPACT-RESISTANT RUBBER-MODIFIED OLE-FINIC NITRILE-ACRYLIC ESTER POLYMERS
June T. Duke, Chagrin Falls, and Dorothy C. Prem, Warrensville Heights, Ohio, assignors to Standard Oil Company, Cleveland, Ohio
No Drawing. Filed Feb. 13, 1969, Ser. No. 799,095
Int. Cl. C08f *15/38*
U.S. Cl. 260—879                                              10 Claims

ABSTRACT OF THE DISCLOSURE

Impact-resistant polymers having low permeability to gases and vapors are prepared by polymerizing an olefinic nitrile, such as acrylonitrile, optionally with an olefinic ester, such as methyl acrylate, in an aqueous medium in the presence of a rubbery polybutadiene or rubbery copolymer of butadiene and styrene.

---

The present invention relates to novel polymeric compositions which have low permeability to gases and more particularly pertains to impact-resistant compositions which function as gas and vapor barrier materials and are composed of a conjugated diene monomer, an olefinically unsaturated nitrile, optionally an ester of an olefinically unsaturated carboxylic acid, and optionally a vinyl aromatic monomer and to a process for preparing same The novel polymeric products of the present invention are prepared by polymerizing a major portion of an olefinically unsaturated nitrile, such as acrylonitrile, and a minor portion of an ester of an olefinically unsaturated carboxylic acid, such as methyl acrylate, in the presence of a preformed rubbery polymer composed of a major proportion of a conjugated diene monomer, such as butadiene, and a minor proportion of a vinyl aromatic monomer, such as styrene.

The conjugated diene monomers useful in the present invention include butadiene-1,3, isoprene, chloroprene, bromoprene, cyanoprene, 2,3-dimethyl-butadiene-1,3, 2-ethyl-butadiene-1,3, 2,3-diethyl-butadiene-1,3 and the like and others. Most preferred for the purpose of this invention are butadiene and isoprene because of their ready availability and their excellent copolymerization properties.

The olefinically unsaturated nitriles useful in the present invention are the alpha, beta-olefinically unsaturated mononitriles having the structure

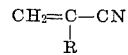

wherein R is hydrogen, a lower alkyl group having from 1 to 4 carbon atoms or a halogen. Such compounds include acrylonitrile, alpha-chloroacrylonitrile, alpha-fluoroacrylonitrile, methacrylonitrile, ethacrylonitrile, and the like. The most preferred olefinically unsaturated nitriles in the present invention are acrylonitrile and methacrylonitrile and mixtures thereof.

The esters of olefinically unsaturated carboxylic acids useful in the present invention are preferably the lower alkyl esters of alpha, beta-olefinically unsaturated carboxylic acids and more preferred are the esters having the structure

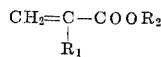

2 wherein $R_1$ is hydrogen, an alkyl group having from 1 to 4 carbon atoms, or a halogen and $R_2$ is an alkyl group having from 1 to 2 carbon atoms. Compounds of this type include methyl acrylate, ethyl acrylate, methyl methacrylate, ethyl methacrylate, methyl alpha-chloro acrylate, ethyl alpha-chloro acrylate, and the like. Most preferred in the present invention are methyl acrylate, ethyl acrylate, methyl methacrylate and ethyl methacrylate.

The polymer compositions of the present invention can be prepared by any of the known general techniques of polymerization including the bulk polymerization, solution polymerization and emulsion or suspension polymerization techniques by batch, continuous or intermittent addition of the monomers and other components. The preferred method is emulsion polymerization. The important point in the novel process of this invention is that the novel polymeric products are prepared by polymerizing the olefinically unsaturated nitrile and the ester of the olefinically unsaturated carboxylic acid in the presence of a preformed homopolymer or copolymer of the conjugated diene monomer and the vinyl aromatic monomer. The polymerization is preferably carried out in aqeous medium in the presence of an emulsifier and a free-radical generating polymerization initiator at a temperature of from about 0 to 100° C. in the substantial absence of molecular oxygen. The simultaneous interpolymerization of a mixture of the conjugated diene monomer, the vinyl aromatic monomer and the ester of an olefinically unsaturated carboxylic acid does not produce polymer products which resemble the polymeric products resulting from the instant process. Moreover, the physical blending of a homopolymer of the conjugated diene monomer or a copolymer of the conjugated diene monomer and a vinyl aromatic monomer with a copolymer of the olefinically unsaturated nitrile and an ester of an olefinically unsaturated carboxylic acid does not product polymeric products which resemble in physical properties the polymeric products of the instant process.

The preferred polymeric compositions embodied herein are those resulting from the polymerization of 100 parts by weight of (A) at least 70% by weight of at least one nitrile having the structure

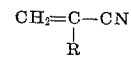

wherein R has the foregoing designation and (B) up to 30% by weight based on the combined weight of (A) and (B) of an ester having the structure

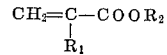

wherein $R_1$ is hydrogen or methyl and $R_2$ is methyl or ethyl in the presence of from 20 to 50 parts by weight of (C) a polymer of a conjugated diene monomer selected from the group consisting of butadiene and isoprene and optionally styrene containing from 50 to 100% by weight of polymerized conjugated diene and from 0 to 50% by weight of polymerized styrene.

More specifically, the present invention can be illustrated in the polymerization of a mixture of acrylonitrile and methyl acrylate in the presence of a preformed rubbery copolymer of butadiene-1,3 and styrene to produce a product having excellent impact strength and exceptionally good impermeability to gases and vapors when exposed to said gases and vapors in the form of a film or thin sheet. Preferably, the acrylonitrile-methyl acrylate monomer feed should contain at least 70% by weight of acrylonitrile based on the combined weights of acrylonitrile and methyl acrylate.

The rubbery copolymer of butadiene-1,3 and styrene preferably contains more than 50% by weight of combined butadiene based on the total weight of combined butadiene and styrene. More preferably, the rubbery butadiene homopolymer or copolymer of butadiene and styrene should contain from 60 to 100% by weight of polymerized butadiene.

In the foregoing polymerization it is preferred that from about 20 to 50 parts of the rubbery copolymer of butadiene and styrene be employed for each 100 parts of combined acrylonitrile and methyl acrylate. It has generally been found that as the relative amount of the rubbery polymer of butadiene or copolymer of butadiene and styrene is increased in the final polymeric product, the impact strength increases and the gas and vapor barrier properties decrease somewhat. It is generally preferred to use just enough of the rubbery polymer to impart the desired impact strength to the polymeric product and to retain the optimum gas and vapor barrier properties in the polymeric product.

The novel polymeric products of the present invention are thermoplastic materials which can be thermoformed into a wide variety of useful articles in any of the conventional ways employed with known thermoplastic polymeric materials, such as by extrusion, milling, molding, drawing, blowing, etc. The polymeric products of this invention have excellent solvent resistance and their impact strength and low permeability to gases and vapors make them very useful in the packaging industry and they are particularly useful in the manufacture of bottles, film and other types of containers for liquids and solids.

In the following illustrative examples, the amounts of ingredients are expressed in parts by weight unless otherwise indicated.

EXAMPLE I (A) A rubber latex was prepared by polymerizing with continuous agitation at 42° C. in the substantial absence of oxygen a mixture of the following ingredients:

|  | Parts |
| --- | --- |
| Styrene | 25 |
| Butadiene-1,3 | 75 |
| ORR soap | 1.40 |
| Potassium persulfate | 0.23 |
| t-Dodecyl mercaptan | 0.4 |
| Water | 200 |

The polymerization was carried out for 23½ hours to a conversion of 67.2% and a total solids of 25.0% (stripped solids).

(B) A high impact, gas barrier resin embodied in this invention was prepared by polymerization of a mixture of the following ingredients:

|  | Parts |
| --- | --- |
| Acrylonitrile | 75 |
| Methyl acrylate | 25 |
| Latex A (above)—rubber on a solids basis | 20 |
| Potassium persulfate | 0.06 |
| GAFAC RE–610 [1] (emulsifier) | 3.0 |
| n-Dodecyl mercaptan | 0.5 |
| Ethylene diamine tetraacetic acid | 0.05 |
| Water | 200 |

[1] A mixture of R—O—(CH₂CH₂O—)ₙPO₃M₂ and
[R—O—(CH₂CH₂O—)ₙ]₂PO₂M
wherein $n$ is a number of from 1 to 40, R is an alkyl or alkaryl group and preferably a nonyl phenyl group and M is hydrogen, ammonia or an alkali metal, which composition is sold by the General Aniline and Film Corp.

The pH was adjusted to about 7 with KOH. The polymerization was carried out in the substantial absence of oxygen at 60° C. for twenty hours so as to produce a conversion of 97% of a latex having 33% solids. The polymer was isolated by coagulation with about 5 ml. of saturated aluminum sulfate, washed with water, and was thoroughly dried. The polymer was compression molded at 170° C. and 4000 p.s.i.g. into test bars, and these bars were found to be light colored, translucent and thermoplastic and to have the following physical properties: notched Izod impact strength, 1.53 foot pounds per inch of notch; heat distortion temperature, 72° C.; and a Brabender Plasticorder torque reading of 2000 meter grams minimum when run at 230° C. and 35 r.p.m. over a 30-minute period. Compression molded discs of this resin were found to have an oxygen transmission rate of 0.3 cc. mil./100 sq. in./24 hrs. atmosphere and a water vapor transmission rate of 5.5 g. mil/100 sq. in./24 hours.

(C) A resin was prepared according to step B of this example with the exception that no latex was included in the polymerization recipe. The resulting resin was compression molded into test bars which were found to have a notched Izod impact value of 0.3 foot pound per inch of notch.

EXAMPLE II (A) The procedure of Example I was repeated except that the polymerization recipe for step B was as follows:

|  | Parts |
| --- | --- |
| Methacrylonitrile | 95 |
| Methyl methacrylate | 5 |
| Latex A—weight of rubber solids | 25 |
| t-Butyl peroxy pivalate | 0.5 |
| GAFAC RE–610 | 3.0 |
| n-Dodecyl mercaptan | 0.5 |
| Ethylene diamine tetraacetic acid | 0.05 |
| Water | 225.0 |

The polymer was recovered by coagulation with about 5 ml. of saturated aluminum sulfate solution, was washed with water and was dried. Compression molded bars of this polymer were found to have the following physical properties: notched Izod impact strength, 1.47 foot pounds per inch of notch; heat distortion temperature, 96° C.; and a Brabender value of 2000 meter grams minimum. A compression molded disc of this polymer was found to have a water vapor transmission rate of 3.9 g. mil/100 sq. in./24 hours.

(B) The procedure of A of this example was repeated except that no latex was used in the polymerization recipe. The final resin when compression molded into test bars was found to have a notched Izod impact value of 0.4 foot pound per inch of notch.

EXAMPLE III

The procedure of Example I was repeated with the exceptions that 71 parts of butadiene and 29 parts of styrene were used as monomers in Step A and 70 parts acrylonitrile and 30 parts ethyl acrylate were used as monomers in Step B. The compression molded test bars of the resulting polymer gave a notched Izod impact value of 8.5 foot pounds per inch of notch; flexural strength, 11,400 p.s.i.; flexural modulus, 420,000 p.s.i.; and an ASTM heat distortion temperature (264 p.s.i.) of 62° C.

EXAMPLE IV (A) The procedure of Example II was repeated with the exception that the sole monomer in Step A was 100 parts of butadiene. The final polymer when molded into test bars had a notched Izod impact strength of 1.2 foot pounds per inch of notch.

(B) A repeat of A of this example with the exception that no latex was employed in the resin polymerization step yielded a resin which was compression molded into test bars and was found to have a notched Izod impact value of 0.18 foot pound per inch of notch.

EXAMPLE V

The procedure of Example IV was repeated with the exception that 100 parts of methacrylonitrile, no methyl methacrylate and 50 parts of rubber were used in step B. The final polymer when molded into test bars was found to have a notched Izod impact value of 2.7 foot pounds per inch of notch.

We claim:

1. The thermoplastic polymeric composition resulting from the polymerization in aqueous medium of 100 parts by weight of
   (A) at least 70% by weight of at least one nitrile having the structure

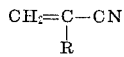

wherein R is hydrogen, a lower alkyl group having from 1 to 4 carbon atoms or a halogen and
   (B) up to 30% by weight based on the combined weight of (A) and (B) of an ester having the structure

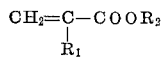

wherein $R_1$ is hydrogen or a methyl group and $R_2$ is a methyl or an ethyl group
   in the presence of from about 20 to 50 parts by weight of
   (C) a rubbery polymer of a conjugated diene monomer selected from the group consisting of butadiene and isoprene and optionally styrene, said rubbery polymer containing from 50 to 100% by weight of polymerized conjugated diene monomer and from 0 to 50% by weight of polymerized styrene.

2. The composition of claim 1 wherein the (A) component is acrylonitrile.

3. The composition of claim 1 wherein the (A) component is methacrylonitrile.

4. The composition of claim 2 wherein the (B) component is ethyl acrylate.

5. The composition of claim 2 wherein the (B) component is methyl acrylate.

6. The composition of claim 5 wherein there is employed a mixture of 75% by weight of (A) and 25% by weight of (B).

7. The composition of claim 3 wherein there is employed 100% by weight of (A).

8. The thermoplastic polymeric composition resulting from the polymerization in an aqueous medium of 100 parts by weight of a mixture of
   (A) 75% by weight of acrylonitrile and
   (B) 25% by weight of methyl acrylate
   in the presence of about 20 parts by weight of
   (C) a copolymer of about 75% by weight of butadiene and 25% by weight of styrene.

9. The thermoplastic polymeric composition resulting from the polymerization in an aqueous medium of 100 parts by weight of a mixture of
   (A) 95% by weight of methacrylonitrile and
   (B) 5% by weight of methyl methacrylate
   in the presence of about 25 parts by weight of
   (C) a copolymer of 75% by weight of butadiene and 25% by weight of styrene.

10. The process comprising polymerizing at a temperature of from about 0° C. to 100° C. in an aqueous medium in the presence of an emulsifier and a free radical polymerization initiator in the substantial absence of molecular oxygen 100 parts by weight of
    (A) at least 70% by weight of at least one nitrile having the structure

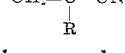

wherein R is hydrogen, a lower alkyl group having from 1 to 4 carbon atoms or a halogen and
    (B) up to 30% by weight based on the combined weight of (A) and (B) of an ester having the structure

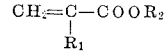

wherein $R_1$ is hydrogen or a methyl group and $R_2$ is a methyl or an ethyl group
    in the presence of from about 20 to 50 parts by weight of
    (C) a rubbery polymer of a conjugated diene monomer selected from the group consisting of butadiene and isoprene and optionally styrene, said rubbery polymer containing from 50 to 100% by weight of polymerized conjugated diene monomer and from 0 to 50% by weight of polymerized styrene.

References Cited
UNITED STATES PATENTS

| 3,262,993 | 7/1966 | Hagemeyer et al. | 260—879 |
| 3,405,087 | 10/1968 | Fryd | 260—33.6 |
| 3,409,705 | 11/1968 | Shields et al. | 260—880 |
| 3,449,471 | 6/1969 | Weitzel et al. | 260—880 |

JAMES A. SEIDLECK, Primary Examiner

R. A. GAITHER, Assistant Examiner